Patented Feb. 10, 1931

1,792,348

UNITED STATES PATENT OFFICE

FRANZ ACKERMANN, OF BINNINGEN, NEAR BASEL, AND CARL APOTHEKER, OF ARLES-HEIM, NEAR BASEL, SWITZERLAND, ASSIGNORS TO SOCIETY OF CHEMICAL INDUSTRY IN BASLE, OF BASEL, SWITZERLAND

ANTHRAQUINONE DERIVATIVES AND PROCESS OF MAKING SAME

No Drawing. Application filed December 19, 1929, Serial No. 415,353, and in Switzerland December 29, 1928.

The present invention relates to the manufacture of new anthraquinone-derivatives which are valuable for the production of fast tints on the fiber. It comprises the process of making these new products, the new products themselves, and the material that has been dyed therewith.

By carefully converting the products of the general formula

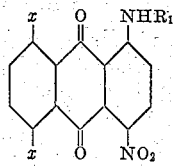

wherein $x$ in one case stands for a nitro-group, and in the other case for an $NHR_1$ group and $R_1$ stands for alkyl or hydrogen, with primary aromatic or hydroaromatic amines, there are obtained compounds of the general formula

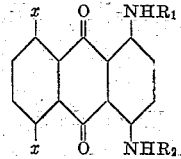

wherein $x$ and $R_1$ have the above stated significations, and $R_2$ stands for an aromatic or hydroaromatic residue. These products, which have already in part been described, have attained no practical use hitherto.

It has now been found that these products may by reduction be converted into new compounds of the general formula

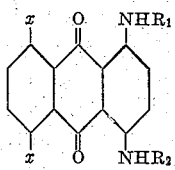

wherein $x$ in one case stands for an $NH_2$-group, and in the other case for an $NHR_1$ group, $R_1$ stands for alkyl or hydrogen, and $R_2$ for an aromatic or hydroaromatic residue.

These products are valuable dyestuffs which, inter alia, dye colloids of cellulose, such as acetyl or alkyl cellulose, or nitrocellulose varnishes, fast blue to blue-green tints. They form dark powders and dissolve in organic solvents, such as alcohol, aniline, pyridine, nitrobenzene, etc., to blue to blue-green solutions.

By a suitable further treatment, for instance by alkylation, for example with compounds, such as alkyl esters of the aromatic sulfonic acids, alkyl halides, such as chloromethyl or bromomethyl or corresponding ethyl-derivatives, alkylenehalides, alkylenechlorhydrins and alkyleneoxides, sulfonation, or acidylation, for example with acetic anhydride or benzoylchloride, or by successive alkylation and sulfonation, the new dyestuffs may be converted into further dyestuffs which, according to their constitution, have affinity for colloids of the cellulose series or for the animal fiber.

Among these products those are particularly valuable which are obtained by further alkylation, particularly with such alkylating agents which introduce methyl or ethyl groups. They correspond with the general formula

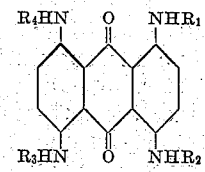

wherein $R_1$, $R_3$ and $R_4$ stand for alkyl residues of which at least one contains not more than 2 carbon atoms, and $R_2$ stands for an aromatic or hydroaromatic residue. They form dark powders and dissolve in solvents, such as alcohol or aniline, to blue-green to green solutions.

The following examples illustrate the invention, the parts being by weight:—

Example 1

10 parts of the reaction product obtained at 150–160° C. from aniline and a technical mixture of 1:5-diamino-4:8-dinitroanthraquinone and 1:8-diamino-4:5-dinitroanthraquinone, which has preferably been freed as far as possible from the β-isomerides, and which corresponds to the formulæ

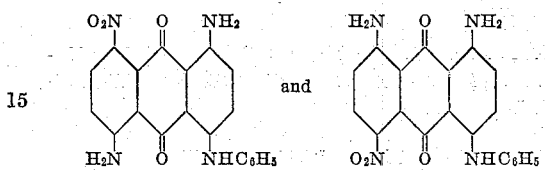

250 parts of alcohol, 250 parts of water and 25 parts of calcined sodium sulfide are heated together to boiling for 4 hours in a reflux apparatus. The cooled mixture is filtered and the solid matter washed and dried. The reduction may also be carried out in water or alcohol alone.

The dark powder thus obtained corresponds with the formula

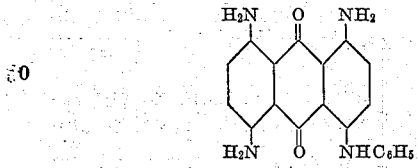

and dissolves in alcohol, aniline, pyridine, or the like, to a blue solution. The new dyestuff dyes acetate silk in an aqueous solution blue.

If, instead of from their mixture, one starts from the pure 1:5- or 1:8-diamino products, the same end-product is obtained.

Instead of reducing the nitro-group, the same may also be replaced by other substituents. The 1:5-diamino-4-nitro-8-phenylamino-anthraquinone may for instance be treated in an autoclave at 165–170° C. with a solution of methylamine, thus obtaining the 1:5-diamino-4-methylamino-8-phenylamino-anthraquinone, which crystallizes from aniline in beautiful blue laminæ melting at 206° C. and which dyes acetate silk blue-green tints.

By heating 10 parts of 1:5-diamino-4-nitro-8-phenylamino-anthraquinone at 135–140° C., while stirring, with 100 parts of hexa-hydroaniline, the 1:5-diamino-4-hexahydroanilido-8-phenylamino-anthraquinone separates on cooling as a blue-black crystalline product. From aniline beautiful blue-violet crystals are obtained which melt at 270° C. and dissolve in alcohol and pyridine to a blue solution.

Example 2

10 parts of 1:5-diamino-4:8-dinitro-anthraquinone are heated with 25 parts of para-anisidine and 50 parts ortho-dichlorobenzene for 72 hours, while stirring, to 155–160° C. On cooling the 1:5-diamino-4-nitro-8-para-anisidino-anthraquinone separates in laminæ which have a coppery lustre and which, when recrystallized from aniline, melt at 273–275° C., dissolving in the usual organic solvents to blue-violet solutions.

In an analogous manner the isomeric 1:8-compound is obtained, which melts at 275–277° C.

10 parts of 1:5-diamino-4-nitro-8-para-anisidino-anthraquinone are stirred in a reflux apparatus for ½ hour with 80 parts of alcohol. There are then added 20 parts of finely pulverized sodium hydrosulfide and the whole is kept under reflux during 4 hours. The 1:4:5-triamino-8-para-anisidino-anthraquinone separates in blue violet crystals which melt at 220° C. and dye acetate silk green-blue tints. The same product is also obtained from 1:8-diamino-4-nitro-5-para-anisidino-anthraquinone.

From 1:5-diamino-4:8-dinitro-anthraquinone and para-toluidine there is obtained at 150–155° C. the 1:5-diamino-4-nitro-8-para-toluidino-anthraquinone melting at 288–290° C.; the reduction product thereof melts at 201° C. and dyes acetate silk green-blue. With ortho-anisidine there is obtained at 160–165° C. the 1:5-diamino-4-nitro-8-ortho-anisidino-anthraquinone; with hexa-hydroaniline at 95–100° C. the 1:5-diamino-4-nitro-8-hexa-hydroanilido-anthraquinone; with para-chloro-aniline at 160–165° C. the 1:5-diamino-4-nitro-8-para-chloro-anilido-anthraquinone; with para-cresidine-methyl ether at 140–150° C. the 1:5-diamino-4-nitro-8-para-cresidine-methyl-ether-anthraquinone. Further condensation products are obtained with α- and β-naphthylamine, the amino-naphthol-ethers, amino-diphenyl, etc.

The reduction products of these substances dye nitrocellulose varnishes blue to green tints.

Example 3

17 parts of the product of the reduction named in Example 1 are stirred with 1500 parts of nitrobenzene at 100° C. There are then added 6 parts of dimethylsulfate and the temperature is maintained at the above degree for 12 hours. After cooling the whole is filtered, the solid matter washed, dried and if necessary further purified by re-dissolution (for example from aniline or alcohol). The dyestuff may also be isolated by adding to the mixture of nitrobenzene and dyestuff without filtering it, sodium carbonate solution and then distilling with steam. The new dyestuff dyes acetate silk blue-green tints of great purity.

Further alkylating products are obtained by substituting other alkylating agents, such as propionyl chloride, butyl, amyl or allyl halides, for the dimethylsulfate.

Example 4

10 parts of 1:4:5-triamino-8-phenylamino-anthraquinone are stirred at 50–55° C. with 500 parts of alcohol and 100 parts of water. Into this solution a slow current of ethylene oxide is passed for 4 hours. On evaporation of the alcoholic solution a blue product is separated which dyes acetate silk green-blue tints.

Example 5

10 parts of 1:4:5-triamino-8-para-toluido-anthraquinone are stirred for 2 to 3 hours at water-bath temperature with 50 parts of monohydrate. On cooling and precipitation with ice a dark blue powder is obtained which completely dissolves in alkalies to a blue solution. It dyes wool from an acid bath green tints. A product dyeing similar tints is obtained by sulfonating the 1:4:5-triamino-8-phenylamino-anthraquinone.

Example 6

10 parts of 1:4:5-triamino-8-phenylamino-anthraquinone are stirred at 180–185° C. with 50 parts of nitrobenzene. To this solution there are added drop by drop for 3 hours 6 parts of acetic anhydride and the whole is kept for 1 hour at a temperature of 180–185° C. The solution is then left to cool, the nitrobenzene expelled by means of steam, whereby a blue powder is obtained which dyes acetate silk blue tints.

What we claim is:—

1. As new products the compounds of the general formula

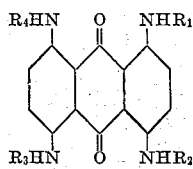

wherein $R_1$, $R_3$ and $R_4$ stand for hydrogen or alkyl, and $R_2$ for an aromatic or hydroaromatic residue, which product form dark powders which dissolve in alcohol or aniline to blue to green solutions, dyeing acetate silk and nitrocellulose varnishes equal tints.

2. As new products the compounds of the general formula

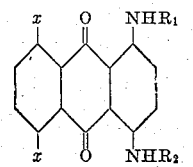

wherein $x$ in one case stands for an $NH_2$-group and in the other case for an $NHR_1$ group, $R_1$ stands for alkyl or hydrogen, $R_2$ for an aromatic or hydroaromatic residue, which products form dark powders which dissolve in alcohol or aniline to blue to blue-green solutions and dye acetate silk and nitrocellulose varnish like tints.

3. As new products the compounds of the general formula

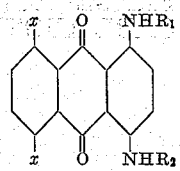

wherein $x$ in one case stands for an $NH_2$-group and in the other case for an $NHR_1$ group, $R_1$ stands for alkyl or hydrogen, and $R_2$ for an aromatic residue, which products form dark powders which dissolve in alcohol or aniline to blue to blue-green solutions and dye acetate silk and nitrocellulose varnish like tints.

4. As new products the compounds of the general formula

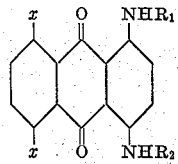

wherein $x$ in one case stands for an $NH_2$-group and in the other case for an $NHR_1$ group, $R_1$ stands for alkyl or hydrogen, and $R_2$ for an aromatic residue of the benzene series, which products form dark powders which dissolve in alcohol or aniline to blue to blue-green solutions and dye acetate silk and nitrocellulose varnish like tints.

5. As new products the compounds of the general formula

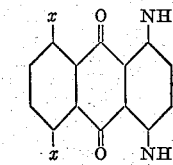

wherein $x$ in one case stands for an $NH_2$-group and in the other case for an $NHR_1$ group, $R_1$ stands for hydrogen or an alkyl radical which contains not more than two carbon atoms, and $R_2$ stands for an aromatic residue of the benzene series, which products form dark powders which dissolve in alcohol or aniline to blue to blue-green solutions and dye acetate silk and nitrocellulose varnish like tints.

6. Material dyed with the products of claim 1.

7. Material dyed with the products of claim 2.

8. Material dyed with the products of claim 3.

9. Material dyed with the products of claim 4.

10. Material dyed with the products of claim 5.

In witness whereof we have hereunto signed our names this 9th day of December, 1929.

FRANZ ACKERMANN.
CARL APOTHEKER.